(12) United States Patent
Münch et al.

(10) Patent No.: US 8,098,138 B2
(45) Date of Patent: Jan. 17, 2012

(54) TRACKING SYSTEM USING RADIO FREQUENCY IDENTIFICATION TECHNOLOGY

(75) Inventors: Tobias Münch, Straubenhardt (DE); Wolfgang Hess, Karlsbad (DE); Stefan Beyer, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 550 days.

(21) Appl. No.: 12/199,334

(22) Filed: Aug. 27, 2008

(65) Prior Publication Data

US 2009/0058606 A1 Mar. 5, 2009

(30) Foreign Application Priority Data

Aug. 27, 2007 (EP) ..................................... 07016779

(51) Int. Cl.
*H04Q 5/22* (2006.01)
(52) U.S. Cl. ..................... 340/10.5; 340/572.1; 340/10.1
(58) Field of Classification Search .................. 340/572, 340/10, 505
See application file for complete search history.

(56) References Cited

U.S. PATENT DOCUMENTS

| 3,970,787 | A | * | 7/1976 | Searle ............................ 381/310 |
| 5,424,747 | A | * | 6/1995 | Chazelas et al. ................ 342/70 |
| 5,452,359 | A | * | 9/1995 | Inanaga et al. ................ 381/310 |
| 6,975,731 | B1 | * | 12/2005 | Cohen et al. ..................... 381/74 |
| 7,085,710 | B1 | | 8/2006 | Beckert |
| 7,756,274 | B2 | * | 7/2010 | Layton et al. ................... 381/17 |
| 2001/0038354 | A1 | | 11/2001 | Gilboa |
| 2003/0031334 | A1 | * | 2/2003 | Layton et al. ................. 381/310 |
| 2006/0273905 | A1 | * | 12/2006 | Choi et al. ................. 340/572.1 |
| 2006/0287748 | A1 | * | 12/2006 | Layton et al. ................... 700/94 |
| 2008/0079588 | A1 | * | 4/2008 | Hughes et al. ............. 340/572.8 |
| 2008/0089539 | A1 | * | 4/2008 | Ishii .............................. 381/311 |
| 2008/0170730 | A1 | * | 7/2008 | Azizi et al. ..................... 381/310 |
| 2009/0052703 | A1 | * | 2/2009 | Hammershoi ................ 381/310 |
| 2010/0109903 | A1 | * | 5/2010 | Carrick .................... 340/825.49 |

FOREIGN PATENT DOCUMENTS

| WO | WO 96/03188 A1 | 2/1996 |
| WO | WO 9603188 A1 * | 2/1996 |
| WO | WO 2007112756 A2 * | 10/2007 |

OTHER PUBLICATIONS

Robjohns, Hugh; Beyerdinamic Headzone pro; Mar./Apr. 2007.
Impinj, Inc.; The RFID Tag Antenna: Orientation Sensitivity; Oct. 2005.
Blauert, J., "Spatial Hearing: The Psychophysics of Human Sound Localization," pp. 37-77, third printing, 2001.
Blauert, J., "Spatial Hearing: The Psychophysics of Human Sound Localization," pp. 289-295, third printing, 2001.
Blauert, J., "Spatial Hearing: The Psychophysics of Human Sound Localization," pp. 373-393, third printing, 2001.
Honda; Operating Instructions for In-Vehicle Entertainment System; 2002; 31 pp.

* cited by examiner

*Primary Examiner* — Travis Hunnings

(57) ABSTRACT

A tracking system determines the orientation of an object. A transceiver transmits a signal and detects responses from multiple transponders. A processing unit determines an orientation parameter of the object by comparing the responses from the multiple transponders.

32 Claims, 6 Drawing Sheets ic TRACKING SYSTEM USING RADIO
FREQUENCY IDENTIFICATION
TECHNOLOGY

PRIORITY CLAIM

This application claims the benefit of priority from European Patent Application No. 07016779.6, filed Aug. 27, 2007, which is incorporated by reference.

BACKGROUND OF THE INVENTION

1. Technical Field

This application relates to tracking systems and, more particularly, to determining the spatial orientation of a moveable object.

2. Related Art

Many applications use surround sound techniques to enhance the quality of audio playback for listeners. The perception of surround sound reproduced from audio data may be based on the principles that listeners use to locate sound sources in space in every day life. Sound signals from a particular source may arrive at a destination at different times with non-uniformities. Additionally, the human ear may influence the frequency of an incoming sound signal dependent on the direction of the incoming signal.

When a listener experiences surround sound from loudspeakers, the listener receives direct sound and multiple reflections. By the time the sounds reach a listener, each of the sounds may acquire a unique signature. These signatures cue the brain as to the size and acoustical properties of the room, the location of the loudspeakers, and the spatial properties of the original sound. When a listener experiences a surround sound reproduction through a headphone unit, the effects of amplitude shifting, phase shifting, and frequency filtering may be eliminated. Although some of these effects may be simulated, in some situations a true surround sound experience may not be created.

SUMMARY

A tracking system determines the orientation of an object. A transceiver transmits a signal and detects responses from multiple transponders. A processing unit determines an orientation parameter of the object by comparing the responses from the multiple transponders.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED
EMBODIMENTS

Figure 1:
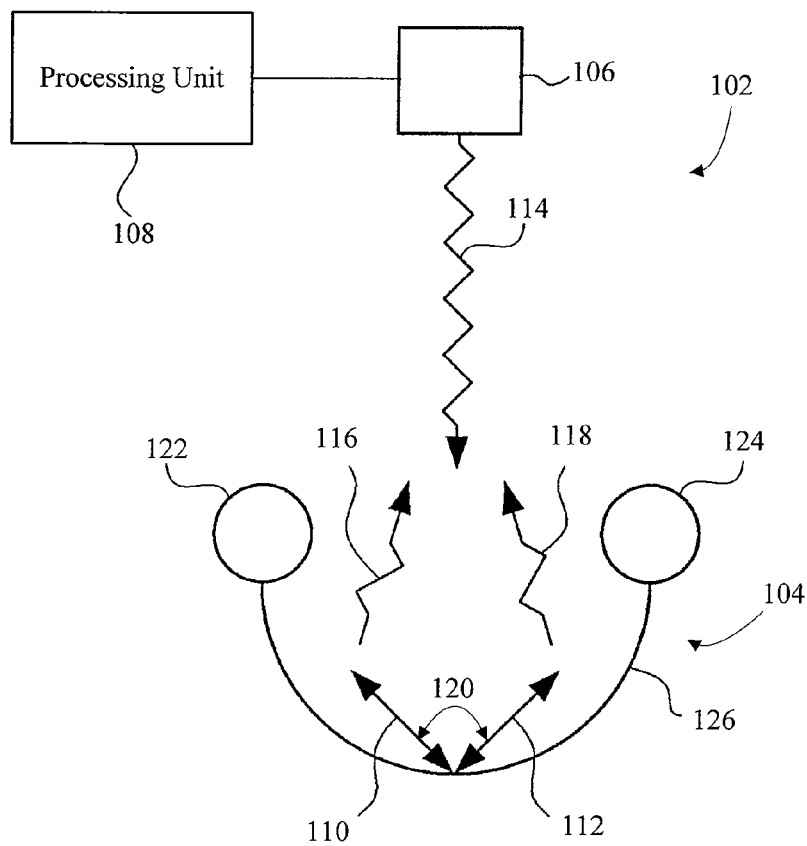
FIG. 1 is a tracking system that determines the orientation of an object.

FIG. 1 shows a tracking system 102 that determines the spatial orientation of a moveable object 104. The tracking system 102 of FIG. 1 includes a transceiver 106, a processing unit 108, and transponders 110 and 112. The transceiver 106 transmits a signal 114 and detects responses 116 and 118 from the transponders 110 and 112. The processing unit 108 compares the responses 116 and 118 to determine an orientation parameter of the object 104.

The transceiver 106 may be located at a fixed position in a predetermined space. The space may be, for instance, a room or an interior of a vehicle. The transceiver 106 may be in a fixed position. The fixed position may provide a reference frame for determining the orientation of the object 104 within the space. The object 104 may be moveable with respect to the transceiver 106. Upon receipt of the responses 116 and 118 from the transponders 110 and 112, the transceiver 106 sends the response 116 and 118 to the processing unit 108 for analysis. The processing unit 108 compares the responses 116 and 118. In one implementation, the processing unit 108 may compare the relative levels of the responses 116 and 118 to determine an orientation parameter of the object 104. If the level of one response is greater than the level of the other response, then the processing unit 108 may determine that the object 104 shifted orientation.

In some implementations, the transceiver 106 and the processing unit 108 are separate components. The processing unit 108 may be connected with the transceiver 106 through a tangible or wireless data transmission channel. In other implementations, the the transceiver 106 and the processing unit 108 are a unitary device.

The transponders 110 and 112 are coupled with the object 104. In one implementation, the transponders 110 and 112 may be fixed to the object 104. In another implementation, the transponders 110 and 112 may be integrated with the object 104 to form a unitary device. In other implementations, the transponders 110 and 112 may be associated with the object 104. The transponders 110 and 112 may be coupled with the object 104 at a common location or interface. The common location or interface may be at a central portion of the object 104. In this configuration, the transmitted signal 114 may be perceived to be substantially the same by both of the transponders 110 and 112. The responses detected by the transceiver 106 may be based on the same signal received at both the transponders 110 and 112.

The transponders 110 and 112 each include a device that sends or receives electromagnetic waves. The transponder 110 may include a first antenna having a predetermined directivity and the transponder 112 may include a second antenna having a predetermined directivity. In one implementation, the orientation of the second antenna is different from an orientation of the first antenna. In FIG. 1, the transponders 110 and 112 are illustrated as double arrows. The arrows represent the axes of the transponder antennas. As shown in FIG. 1, the axes of the antennas of the transponders 110 and 112 extend substantially in the plane of the drawing, but have a different orientation with respect to each other.

The transponders 110 and 112 may be positioned so that the antenna of the transponder 110 and the antenna of the transponder 112 form an angle 120. The angle 120 may be an acute, obtuse, reflex, or right angle. The antenna of the transponder 110 may be located substantially on a first plane and the antenna of the transponder 112 may be located substantially on a second plane. The first and second angles may form the angle 120. In some implementations, the antennas are positioned so that the angle 120 is in the range from about 45° to about 90°. In other implementations, the antennas are positioned so that the angle 120 is in the range from about 75° to about 90°. In yet another implementation, the antennas of the transponders 110 and 112 are positioned so that the angle 120 is approximately a right angle.

The transceiver 106 may detect a level of the respective responses from the transponders 110 and 112. The levels of the responses may vary depending on the relative orientation between the signal (e.g., electromagnetic field) created by the transceiver 106 and the antenna elements of the transponders 110 and 112. The processing unit 108 may compare the respective response levels to determine an orientation parameter of the object 104.

In some implementations, the tracking system 102 uses Radio Frequency Identification ("RFID") technology to track the object 104. Specifically, the transponders 110 and 112 may be RFID transponders/tags and the transceiver 106 may be an RFID reader.

An RFID transponder may comprise an electronic device that may be coupled to an object. An RFID transponder may include an antenna used to receive a signal transmitted by the RFID reader, an integrated circuit, and a memory. In some implementations, the memory may be non-volatile memory. In other implementations, the RFID tag may also include a re-writable memory.

An RFID reader includes an antenna for emitting and/or receiving a signal, an electronic circuit for transmitting/receiving the signal to/from the RFID tag, and a memory for storing data included in the signal received from the RFID tag. The antenna may have a predetermined directivity, which defines an orientation of the antenna in space. Data received from the RFID tags may be transmitted to a RFID processing component upon reception or at a later time after storage.

In some implementations, an RFID reader may generate a high frequency alternating electromagnetic field, which may be received by the antenna of an RFID transponder. When a passive RFID transponder is used, the electromagnetic field transmitted by the reader induces an electric current in the antenna of the RFID transponder. The induced current powers and/or activates the integrated circuit of the RFID transponder. The generated induction current may generate an electromagnetic response field that may influence the electromagnetic field transmitted from the reader. The RFID reader may be capable of detecting the influence of the RFID transponder on the electromagnetic field. The level of the induced current, and consequently the level of the response, may depend on the relative orientation between the electromagnetic field and the antenna element of the RFID transponder.

The induction current may charge a capacitor to act as a power supply for the integrated circuit chip. Therefore, some passive RFID transponders may be operated completely autonomously without any internal power supply or connection to an external power supply. The amount of energy needed for operation may be supplied by the signal field of the RFID reader. To achieve a permanent power supply in a passive RFID tag, the RFID reader may emit an electromagnetic field permanently (e.g., "continuous wave"). Alternatively, an active RFID transponder may be used. Active RFID transponders include an internal power supply, such as a battery.

When activated, the integrated circuit of the RFID transponder receives information, such as commands, that have been modulated by the RFID reader into an electromagnetic spectrum. The RFID transponder may modulate information into the response field that may be transmitted to the RFID reader. The RFID transponder may include a unique identifier in the response field. The RFID transponder may store the unique identifier in a local non-volatile memory. The unique identifier allows the RFID reader to distinguish between RFID transponders. When the RFID transponder is activated or addressed by an RFID reader, the transponder responds with one or more unique identifiers. In some applications, other information may also be included. The RFID transponders may modulate information into the response field in response to a query transmitted from the RFID reader. The RFID reader may then forward the information to a processing unit for further processing.

RFID technology may recognize an item without direct visual contact. The RFID reader may recognize information that passes through different media. Electromagnetic fields may pass through many substances. Accordingly, even if the RFID reader and/or the RFID transponder are "hidden" (for instance, when a component is included inside a larger object), the RFID reader may receive and decode information from the RFID transponder. The device or program that converts the coded data to its original form may not be limited to certain operating characteristics. The RFID systems may differ in operational ranges (e.g., distance or frequency) and other parameters.

In some tracking systems, a response from an RFID transponder may be based on an inductive coupling through an antenna. Passive transponders may employ a load modulation (e.g., they extract magnetic field energy by short circuiting). The reader may be capable of detecting field changes. Some passive RFID transponders have a small size and weight, but may be characterized by a relatively small operational range (e.g., the distance between reader and transponder). Some passive RFID transponder systems may be operated in a range of approximately a few centimeters. Other RFID transponder systems may have larger operating ranges. The operational frequency of passive RFID systems may operate in a range of tens to hundreds of Kilohertz (LF—low frequency), or a few Megahertz, up to approximately 30 MHz (HF—high frequency/RF—radio frequency). In some implementations, passive RFID systems have an operating frequency in the range of about 30 kHz to about 300 kHz.

Active transponders may operate in the electromagnetic far field. The electromagnetic far field may form electromagnetic waves radiated into space. To obtain a response, "backscattering" may be employed. Backscattering may include absorbing/reflecting the electromagnetic waves. The operating frequency range of active transponders operating in the far field may be in an ultra high frequency (UHF) range from approximately 300 MHz to approximately 3 GHz, or even in a microwave frequency range. Dipoles may be used as UHF antennas. Since dipole antennas may be characterized by a particular orientation of an antenna axis, the response obtained by backscattering may be orientation dependent. In some implementations, active RFID systems may have an operating frequency in the range of about 300 MHz to about 1 GHz. In other implementations, active RFID systems may have an operating frequency in the range of about 1 GHz to about 3 GHz. In yet other implementations, active RFID systems may have an operating frequency in the range of about 2.3 GHz to about 2.5 GHz. Other active RFID systems may have an operating frequency of about 2.4 GHz. Yet other implementations may have an operating frequency in the range of about 3 MHz to about 30 MHz.

Active RFID transponders may be sourced by one or more cells that supply current to the integrated circuit. To save power, active RFID transponders may maintain or sustain a standby state while awaiting activation. The integrated circuit of an active transponder in a standby state may become active upon receipt of a specific activation signal. Although energy from a power source, such as a battery, may not be used to generate the modulated response signal, the operation range of the RFID transponders may be larger than some passive RFID transponders. Backscattering may require less field energy than inductive coupling in the near field. An operation range of up to about several meters or about tens of meters may be possible with active transponder technology. Some active transponders may have a larger range, such as a range of about hundreds of meters.

Semi-passive RFID transponders may also be used in the tracking system 102. Some semi-passive RFID transponders receive a signal from the reader on a first frequency and use the received energy to reply on a second frequency.

Figure 10:
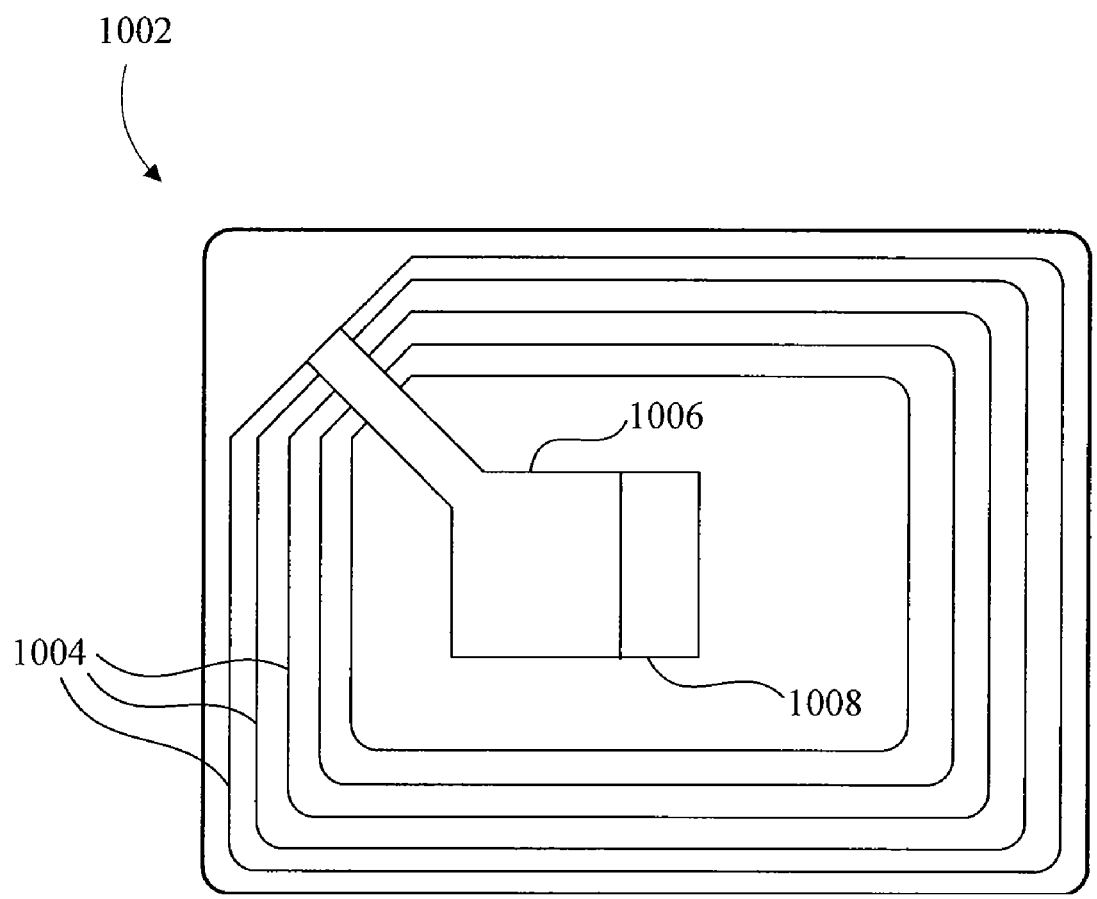
FIG. 10 is an example of one type of transponder for use with a tracking system.

The type of transponders to be employed in the tracking system 102 is not limited to any particular kind. FIG. 10 shows an example of one type of RFID transponder 1002. The RFID transponder 1002 of FIG. 10 may include an antenna 1004 for receiving a signal (e.g., electromagnetic field) transmitted by the RFID reader, a circuit 1006, and a memory 1008. An electromagnetic field may induce a current in the antenna 1004 which powers the circuit 1006 and memory 1008 so that the transponder 1002 may transmit a response to the RFID reader signal.

In FIG. 1, the transceiver 106 generates a high frequency electromagnetic field 114 to track the object 104. In the implementations where the transponders 110 and 112 are passive transponders, the transponders 110 and 112 may include a combination of an antenna coil and a capacitor. When the transponders 110 and 112 are within the range of the electromagnetic field 114, a current is induced in the transponders 110 and 112. The transponders 110 and 112 then influence (e.g., change) the electromagnetic field 114 through their responses 116 and 118. The transceiver 106 may detect the field modification and pass the information to the processing unit 108 for evaluation, and in some applications identification. The transceiver 106 and the transponders 110 and 112 may enable data transmission through modulation.

The intensity of the induced electromagnetic current may depend on the relative orientation between the electromagnetic field and the transponder antenna coil. Accordingly, the level of the transponder response is different for different antenna orientations of the transponder. Consequently, information about the orientation of a transponder antenna may be determined through evaluation of the response levels.

The response levels from the transponders 110 and 112 may depend on other factors such as an overall distance between the transceiver 106 and transponders 110 and 112. The principal of induction may allow determination of a correlation between orientation and corresponding response level of an antenna within an angular range from 0° to 90°. Therefore, some systems include at least two transponders to determine a single orientation parameter. In some implementations, the distance between the transceiver 106 and the transponders 110 and 112 may remain substantially fixed, at least after an initial phase of calibration has been performed.

The tracking system 102 may be calibrated before it begins tracking the object 104. Calibration may occur when the transceiver 106 determines a basic or starting orientation of the object 104. The transceiver 106 may transmit a signal and detect responses from the transponders 110 and 112. The processing unit 108 may analyze the response to determine the basic or starting orientation of the object 104. The calibration may occur by analyzing several responses from the transponders 110 and 112 in time. Such a calibration may determine an average starting orientation over time. Calibration may be initialized by a user input. In the case of tracking a headphone unit (e.g., worn by a passenger of a vehicle), a basic orientation (e.g., average orientation) may correspond to a straightforward orientation of the face of the person. After a user initializes the calibration phase, the processing unit 108 is aware of the basic orientation of the headphone unit. Accordingly, further processing of the sound field may be performed based on orientation changes with respect to the basic orientation.

In FIG. 1, the tracked object 104 may be a headphone unit that includes a pair of speakers 122 and 124 connected by a connection member 126. The headphone unit may receive audio data through a wired or wireless connection. In some implementations, the headphone unit simulates surround sound reproduction of audio data. When wearing the headphones unit, the plane of the drawing may substantially correspond to a horizontal plane. The transponders 110 and 112 may be coupled with the connection member 126. A coupling position of the transponders 110 and 112 at the central part of the connection member 126 may correspond to the intersection of the substantially vertical axis of rotation of the person's head with the plane of the drawing.

In FIG. 1, two transponders 110 and 112 form an angle 120 of approximately 90°. The transponders 110 and 112 may be fixed at a central position of the connection member 126. The transceiver 106 may be arranged in front of the headphone unit, so that each of the antennas of the transponders 110 and 112 form an angle of approximately 45° with respect to a connection line between the transceiver 106 and respective transponder mounting point in the case of the illustrated symmetric position. In the symmetric position shown in FIG. 1, the response 116 from the transponder 110 and the response 118 from the transponder 112 have approximately equal levels. If the headphone unit was to twist one direction or the other, then the levels of the responses 116 and 118 would no longer be approximately equal. The responses 116 and 118 may be distinguished from each other as each response includes the unique transponder ID of the respective transponder.

Since headphones make contact with the head of a person wearing them, orientation changes of head and headphones often correspond to each other. Therefore, both the head and the headphones may be considered as the object to be tracked by the tracking system 102. The orientation parameter determined by the tracking system 102 may be a rotation angle of the object 104 around a predetermined axis. The antenna of the transponders 110 and 112 may extend substantially in a plane perpendicular to the predetermined axis. If, for instance, the object is a pair of headphones worn by a person, a tracked orientation parameter may be a rotation angle of the headphones around a central vertical axis of the head of the person. If the transponders 110 and 112 are positioned at a central position of the connection member 126 of the headphones, and the antenna axes are extending in a plane substantially perpendicular to the central axis of the head, the transponder orientations may directly correspond to a rotation angle of the headphones around the vertical axis. The portion of the object 104 to which the transponders 110 and 112 are fixed may remain at a substantially unchanged position with respect to the transceiver 106. If the transponder positions remain substantially unchanged, any influence on the responses that are caused by position changes rather than orientation changes may be neglected. For instance, in a case where the object is a pair of headphones worn by a person sitting in a vehicle, the mounting position, corresponding to a central position of the connecting member of a pair of headphones worn by the person, may be considered substantially unchanged with respect to the internal space of the vehicle.

Figure 2:
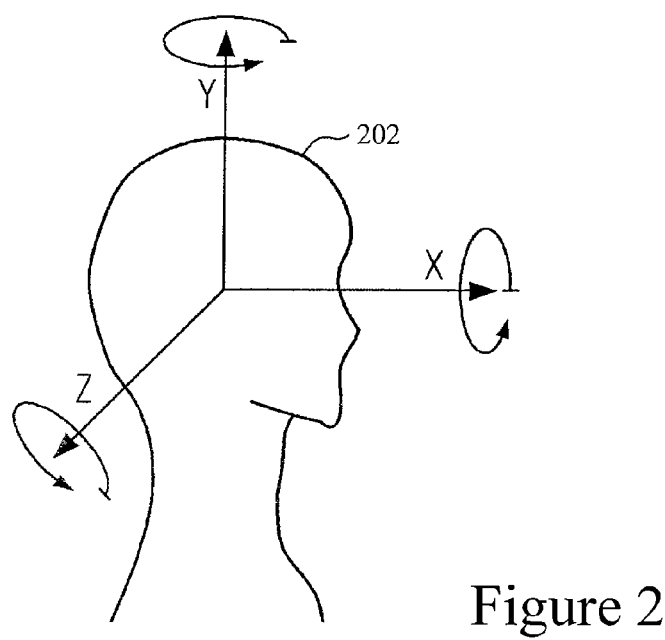
FIG. 2 shows the freedom of motion of an object.

FIG. 2 shows the freedom of motion of a moveable object. Specifically, FIG. 2 shows the freedom of motion of a head 202. A human head 202 has a maximum of three rotational degrees of freedom defining the overall orientation of the head. The three rotational degrees of freedom correspond to a rotation around the illustrated axes X, Y and Z, respectively (roll, yaw, and pitch).

The orientation tracking system according to FIG. 1 is capable of determining the orientation corresponding to a rotation around the vertical axis (Y-axis), while it is assumed that the overall position of the head, as well as the orientation with respect to X and Z-axes, remain constant. The Y-axis as illustrated in FIG. 2 corresponds to an axis protruding the plane of FIG. 1 in a perpendicular direction, and intersecting the plane of FIG. 1 at the mounting position of the transponders 110 and 112.

Figure 3:
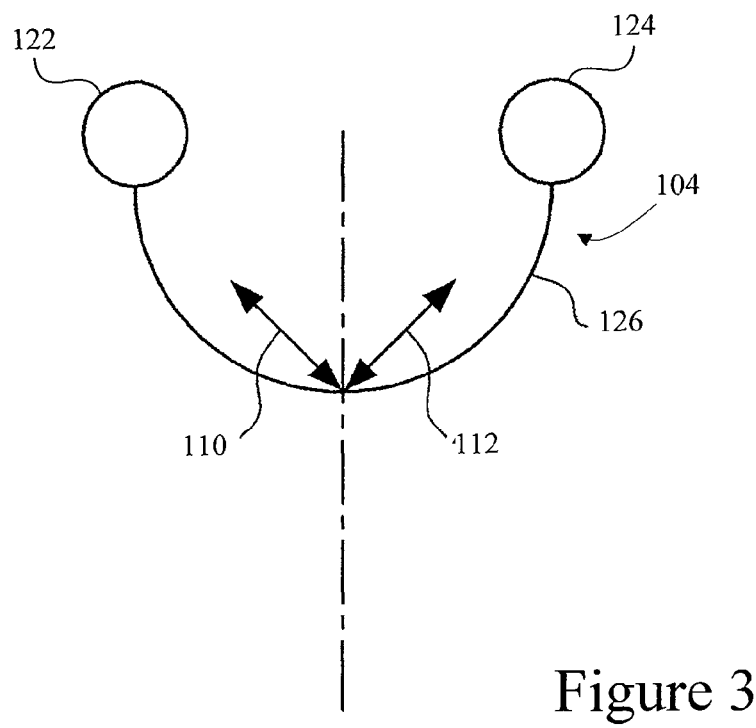
FIGS. 3 and 4 show multiple transponders coupled with an object.
Figure 4:
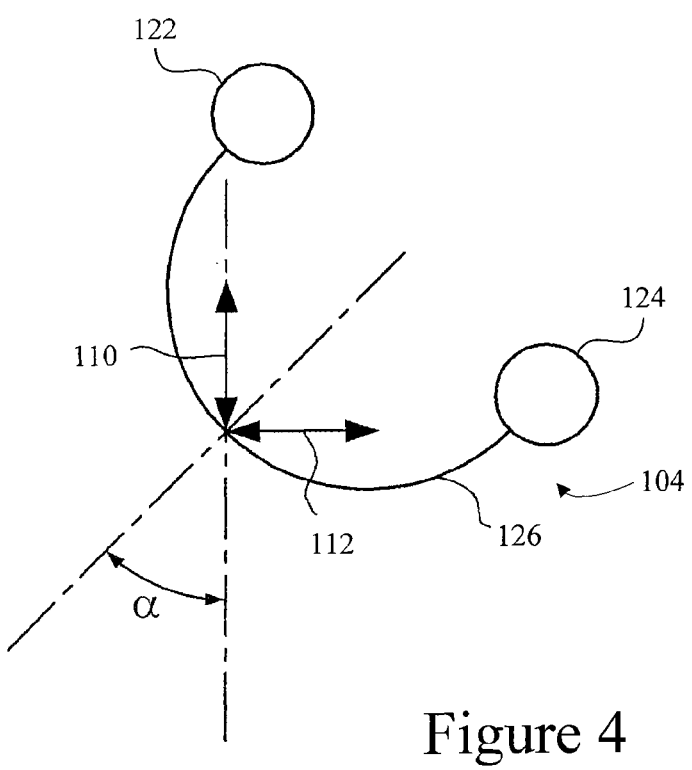

If the head 202 is turned around vertical direction Y in a first direction of rotation by an angle of about 45°, it results in the level of the response from one transponder becoming zero, while the level of the response from the other transponder reaches its maximum. Such a situation is illustrated in FIGS. 3 and 4. FIGS. 3 and 4 are illustrations of an object 104, such as a headphone unit on the head of a listener, having two transponders 110 and 112 and having a single degree of freedom of orientation. The single degree of freedom of orientation may be determined by a single orientation parameter. The arrangement of the headphone unit in space illustrated in FIG. 3 may correspond to a starting position of the headphone unit, from which any orientation changes may be detected. In FIG. 4, the headphone unit has been rotated about a vertical axis towards the right hand side. The rotation is represented by an angle α (α=45° in the drawing). In FIG. 4, one transponder (e.g., transponder 110) has become substantially parallel to the connection line between transponders and transceiver (represented by the dashed line in FIG. 3), while the antenna orientation of the other transponder (e.g., transponder 112) has become perpendicular to the connection line. In this case, the transponder 112 would respond with a maximum level upon turning towards the right hand side, and the transponder 110 would respond with a minimum level.

If the headphone unit is rotated by an angle of about 45° in the opposite direction (not shown), the respective response levels will show an inverse behavior as compared to FIG. 4. In that case, the transponder 110 would respond with a maximum level upon turning towards the left hand side, and the transponder 112 would respond with a minimum level. For an angle of α=0, the respective response levels may be about equal to each other. The response levels of the first and second transponders 110 and 112 respectively change continuously with the rotation angle α. Thereby, an orientation change of the head wearing headphones due to rotation around the vertical axis may be detected. The particular arrangements and the particular values of angles illustrated and described in connection with FIGS. 1, 3, and 4 are given by way of example only. Other arrangements of at least two transponders, the antennas of which have different orientations, are applicable within the framework of the tracking system 102.

Figure 5:
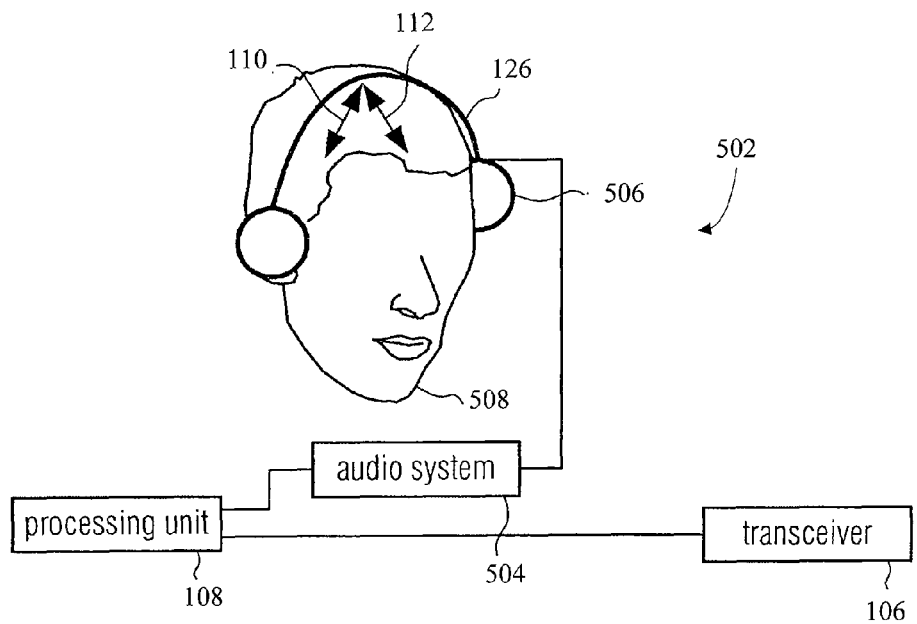
FIG. 5 is another view of a tracking system.

FIG. 5 illustrates a tracking system 502 coupled with an audio system 504. The audio system 504 may be connected with a headphone unit 506 worn by a user 508. The headphone unit 506 may represent a moveable object, the orientation of which is to be tracked by the tracking system 502. The audio system 504 may include multiple audio components, such as a receiving unit, CD/DVD reproduction devices, an amplifier, a surround sound processing component for headphones, and other audio reproduction components. In some implementation, the audio system 504 comprises an audio/video system that includes one or more video display devices.

The tracking system 502 may include a transceiver 106, multiple transponders 110 and 112 attached to a headphone connection member 126, and a processing unit 108 connected to the transceiver 106 and the audio system 504. Since electromagnetic coupling is employed between transceiver 106 and transponders 110 and 112, a physical connection line may not be required for information exchange. Regarding the connection line between audio system 504 and the headphone unit 506, a physical connection line or a wireless connection may be employed. The number and particular location of the transponders is not limited to the illustrated example. If desired, more than two transponders may be employed to determine additional orientation parameters corresponding to additional rotational degrees of freedom. Alternatively, additional transponders may be used in order to improve angular resolution or to cover a larger detection span than about +/−45°.

Figure 6:
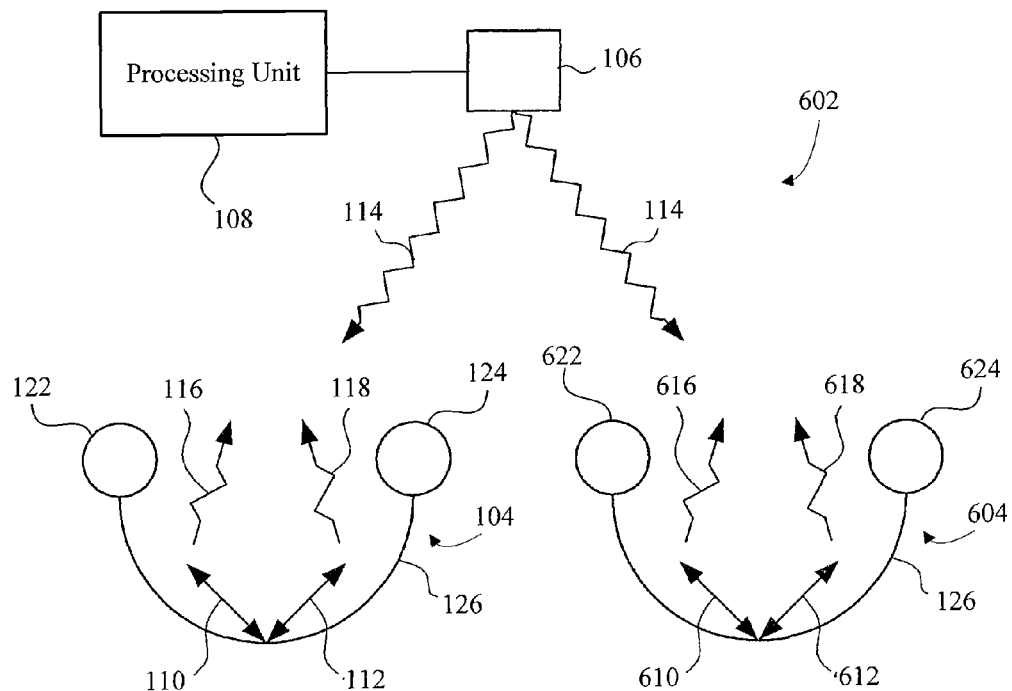
FIG. 6 is a tracking system that determines the orientation of multiple objects.

FIG. 6 is a tracking system 602 that determines the spatial orientation of multiple moveable objects 104 and 604. The tracking system 602 may track more than one object with a single transceiver 106. FIG. 6 illustrates a configuration where two objects 104 and 604 respond to a signal 114 emitted by the transceiver 106. The responses 116, 118, 616, and 618 of the respective transponders 110, 112, 610, and 612 each include the unique transponder identifier stored in the non-volatile memory of each transponder. Therefore, the transceiver 106 may distinguish between the responses received from each of the transponders 110, 112, 610, and 612. The processing unit 108 may then use the responses to determine the orientations of the objects 104 and 604. A situation as illustrated in FIG. 6 may occur, for instance, in the case of employing the tracking system 602 for separately tracking the orientation of headphones of two rear seat passengers of a vehicle. Additionally, the tracking system 602 may track the orientation of more than two objects by configuring the additional objects with transponders to communicate with the transceiver 106.

Figure 7:
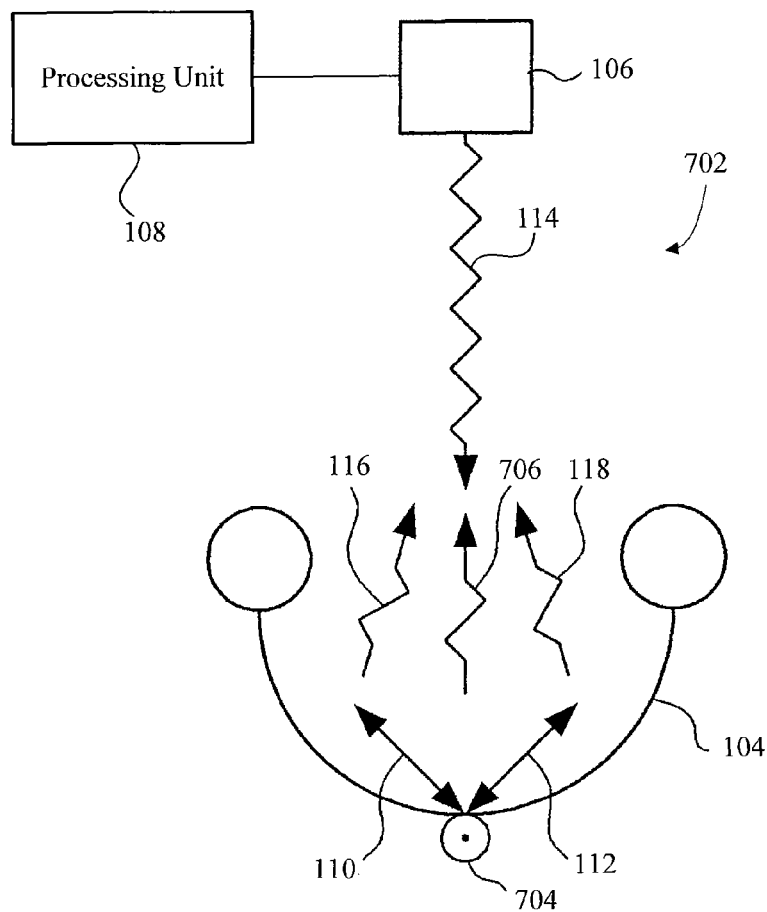
FIG. 7 is a tracking system that determines multiple orientation parameters of an object.

FIG. 7 is a tracking system 702 that determines multiple orientation parameters of a moveable object 104. In FIG. 7, three transponders 110, 112, and 704 are coupled to the object 104. The transponders 110 and 112 may include antenna orientations that substantially extend in the plane of the drawing, and include an acute, obtuse, reflex, or right angle between each other. By comparing the responses 116 and 118 received from the transponder 110 and 112, an orientation parameter corresponding to a rotation angle round a vertical axis (e.g., axis Y of FIG. 2) may be determined, as described for the configuration of FIG. 1.

The antenna of the transponder 704 may extend in a substantially perpendicular direction with respect to the plane of the drawing. Antenna 704 is represented by a dot within a circle in FIG. 7. By comparing a response 706 from antenna 704 with the response from either the transponder 110 or the transponder 112, an additional orientation parameter of the object 104 corresponding to a rotation around a substantially horizontal axis (e.g., axis Z of FIG. 2) may be determined. In a headphone application, a respective movement about axis Z corresponds to a nodding of the head. The number of rotational degrees of freedom that may be tracked by the tracking system 702 is not limited to two. In other implementations, additional rotational degrees of freedom of the object 104 may be tracked.

Figure 8:
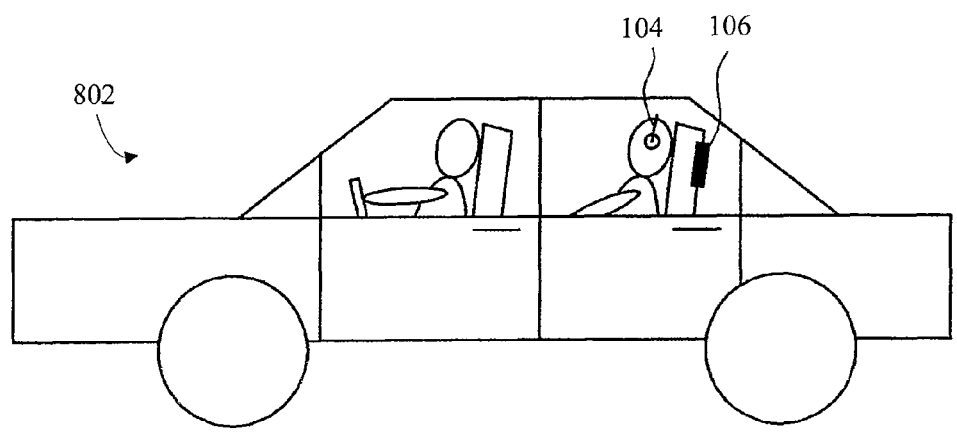
FIG. 8 shows a tracking system in a vehicle.

FIG. 8 illustrates a vehicle 802 with a vehicle entertainment and information system. The vehicle entertainment and information system may include a tracking system to track the orientation of a moveable object. The moveable object may be a headphone unit 804, such as wireless headphones. Furthermore, the headphone unit may be configured to simulate a surround sound reproduction. A person wearing the headphone unit 804 may occupy a seat of the vehicle 802. In FIG. 8, the transceiver 106 of the tracking system is shown in a head rest of a vehicle. The tracking system may use the transceiver 106 to determine an orientation parameter of the headphone unit 804. In FIG. 8, transponders attached to the headphone unit 804 may be located in relatively close proximity to the transceiver 106. Accordingly, a low power tracking system, such as a passive RFID system may be used. Since a user position with respect to the head rest may be fixed within a limited range, the tracking system may be operated without performing a calibration step.

Figure 9:
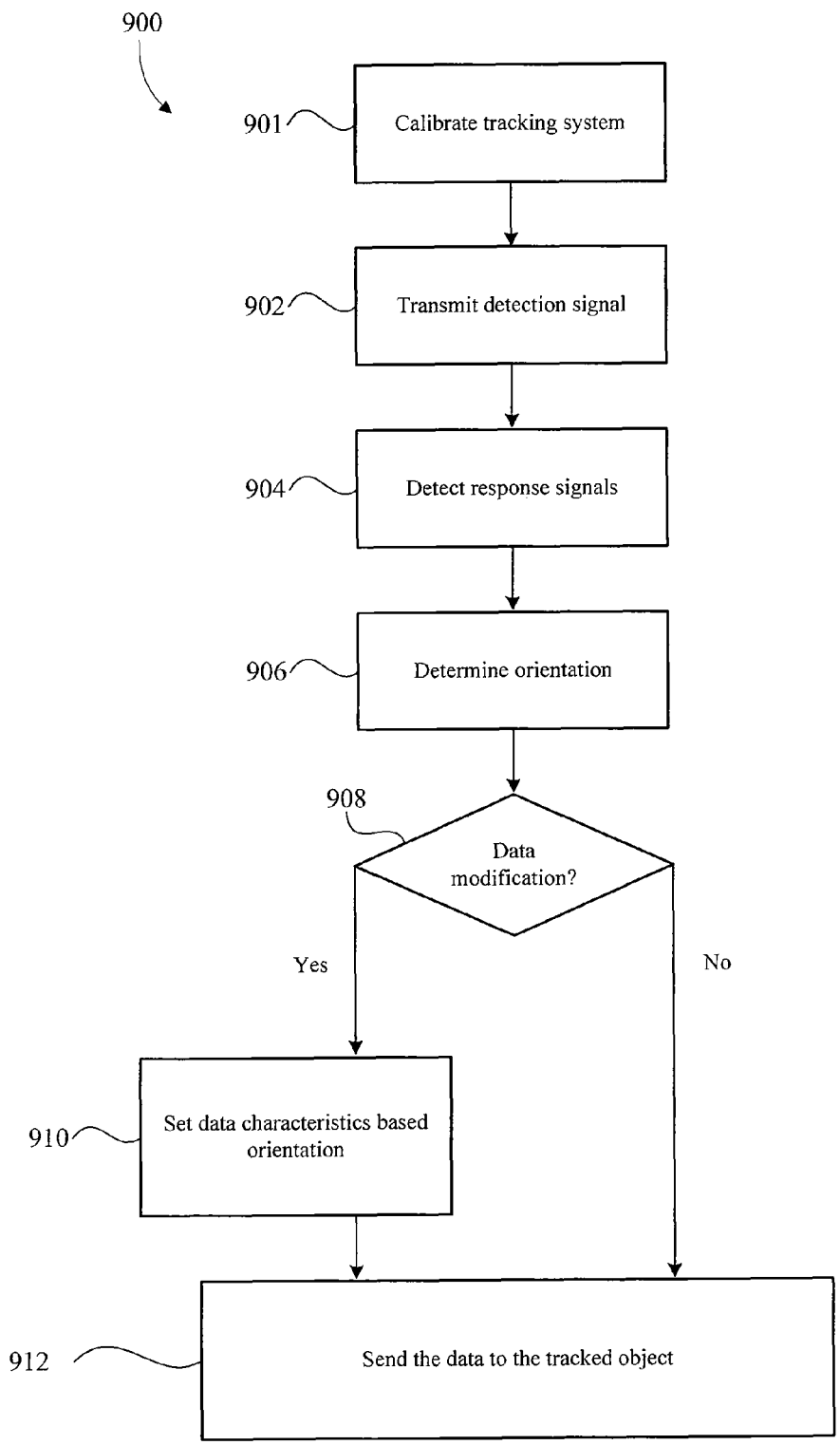
FIG. 9 illustrates a process that determines the orientation of an object.

FIG. 9 is a process that determines an orientation of a movable object. Logic 900 illustrates various acts that may be performed by the tracking system components illustrated in FIG. 1. At act 901, the tracking system may be calibrated. During calibration, the tracking system may determine a basic or average orientation of the movable object. After the system has been calibrated, or in implementations that do not require calibration, logic 900 proceeds to act 902.

At act 902, a signal is transmitted into a space. The signal may comprise an electromagnetic field. If a transponder is within range of an electromagnetic field, the transponder will produce a signal in response to the electromagnetic field. The response signal may include a unique identifier. Each transponder that receives the electromagnetic field may send a response signal.

At act 904, the response signals are detected. If two transponders are within range of the electromagnetic field, then two response signals may be detected. At act 906, the orientation of the movable object is determined. To determine the orientation of the moveable object, response signals from multiple transponders are compared. Where two transponders are used, a comparison of the two response signals may result in the determination of one orientation parameter of the moveable object.

The moveable object may be a headphone unit. The two transponders may be positioned on the headphone unit so that a head-twisting movement may be detected through a comparison of the signal strength levels of the two response signals. If three transponders are used, then a comparison of the three response signals may result in the determination of two orientation parameters of the headphone unit. The three transponders may be positioned on the headphone unit so that both head-twisting and head-nodding movements may be detected through a comparison of the signal strength levels of the three response signals. Additional transponder and transponder configurations may be used to determine additional orientation parameters of the movable object, such as a headphone unit.

At act 908, it is determined whether to modify data based on the detected orientation of the moveable object before transmission to the moveable object. In one implementation, the moveable object is a headphone unit that is configured to simulate a surround sound reproduction of audio data for a wearer of the headphone unit. If the audio data need not be modified based on the tracked orientation of the headphone unit, then logic 900 proceeds to act 912. This may be the case where the headphone unit has not changed its orientation since the last tracked orientation measurement. This may also be the case where any detected change is negligible. In this scenario, the audio data (without new modifications based on orientation) is sent to the headphone unit at act 912.

Alternatively, if at act 908 it is decided that the data will be modified based on the detected orientation of the moveable object before transmission to the moveable object, then logic 900 proceeds to act 910. At act 910, the data characteristics may be programmed based on the detected orientation of the moveable object. In the case of a headphone unit, characteristics of the audio data to be sent to the headphone unit may be set based on the orientation of the headphone unit. Specifically, the amplitude may be adjusted, the phase may be shifted, or other modifications may be made to the audio data for one or both speakers of the headphone unit.

The audio data to be sent to the headphone unit may be modified to simulate the natural effects that would occur if the listener was to change head orientation in a space in a surround sound field. As a first illustration, consider the situation where a listener is facing a sound source, such as a loudspeaker in a room. When the listener turns to the left, the listener will detect that the sound source is now on the listener's right side. As a second illustration, consider the situation where a listener is facing a video screen with associated audio content. When the listener moves from a central position in front of the video screen to a position to one side of the video screen, the listener expects an amendment of the perceived sound characteristics.

These effects may be simulated through headphones by modifying the audio data to be sent to the headphone unit based on the detected orientation of the headphone unit (which corresponds to the orientation of the wearer of the headphone unit). A headphone unit that produces a surround sound simulation for a wearer of the headphone unit may produce a virtual sound source within a virtual sound field. When the headphone unit turns or changes position, the audio data may be modified to reflect a corresponding change to the listener's spatial orientation relative to the virtual sound source. In one instance, the headphone unit turns to the left (indicating that the wearer turned to the left) and the audio data to be sent to the headphone unit is modified so that the virtual sound source appears to be on the right side of the wearer. After the orientation based data modifications have been made at act 910, the modified data is sent to the moveable object at act 912.

In FIG. 1, the tracking system 102 enables orientation tracking of an object 104 on the basis of comparing the orientation-dependent responses 116 and 118 to a signal 114 emitted by a transceiver 106, received from different transponders 110 and 112 fixed to the object 102 in different orientations. The responses of the transponders 110 and 112 change when the orientation of the object 104 in space is changed. In one implementation, a single transceiver 106 is employed to emit the signal and detect the responses. In that implementation, no separate synchronization channel may be necessary. In other implementations, multiple transceivers may be used to emit the signal and detect the responses.

The tracking system 102 may be suitable for an audio system comprising headphones simulating surround sound. The system may also interface or comprise a unitary party of a vehicle entertainment system (e.g., a system reproducing DVD or other multi-channel media sources), teleconferencing systems, 3-D sound systems (e.g., computer games), or home cinematography systems.

Each of the processes described may be encoded in a computer readable medium such as a memory, programmed within a device such as one or more circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are described as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM resident to a processor or a controller.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A tracking system, comprising:
    a first transponder coupled with an object and having a first antenna with a predetermined directivity;
    a second transponder coupled with the object and having a second antenna with a predetermined directivity, where an orientation of the second antenna is different from an orientation of the first antenna;
    a transceiver configured to transmit a signal and detect a response from the first transponder and a response from the second transponder; and
    a processing unit configured to determine an orientation parameter of the object by comparing the response from the first transponder and the response from the second transponder, where the object comprises a headphone unit configured to simulate a surround sound reproduction of non-binaural audio data.

2. The tracking system of claim 1, where the transceiver is configured to detect a level of the response from the first transponder and a level of the response from the second transponder; and
    where the processing unit is configured to compare the level of the response from the first transponder with the level of the response from the second transponder to determine the orientation parameter of the object.

3. The tracking system of claim 1, where the first and second transponders comprise RFID transponders, and where the transceiver comprises an RFID reader.

4. The tracking system of claim 1, where the first and second transponders comprise passive RFID transponders.

5. The tracking system of claim 1, where the first and second transponders comprise active RFID transponders.

6. The tracking system of claim 1, where the first transponder comprises a memory for storing a first unique transponder identifier, where the second transponder comprises a memory for storing a second unique transponder identifier; and
    where the response from the first transponder includes the first unique transponder identifier, where the response from the second transponder includes the second unique transponder identifier.

7. The tracking system of claim 1, further comprising a third transponder coupled with the object and having a third antenna with a predetermined directivity, where an orientation of the third antenna is different from the orientation of the first antenna; and
    where the transceiver is configured to detect a response from the third transponder, where the orientation parameter comprises a first orientation parameter, where the processing unit is configured to compare the response from the first transponder and the response from the third transponder to determine a second orientation parameter of the object.

8. The tracking system of claim 1, where the object comprises a first object, the tracking system further comprising:
    a third transponder coupled with a second object and having a third antenna with a predetermined directivity; and
    a fourth transponder coupled with the second object and having a fourth antenna with a predetermined directivity, where an orientation of the fourth antenna is different from an orientation of the third antenna;

where the transceiver is configured to detect a response from the third transponder and a response from the fourth transponder, where the processing unit is configured to determine an orientation parameter of the second object by comparing the response from the third transponder and the response from the fourth transponder.

9. The tracking system of claim 1, where the first and second transponders are attached to or integrated in the object at a common location.

10. The tracking system of claim 1, where the first antenna is located substantially on a first plane, where the second antenna is located substantially on a second plane, where the first and second transponders are coupled with the object in positions so that the first and second planes form an angle between about 45 degrees and about 90 degrees.

11. The tracking system of claim 10, where the first and second transponders are coupled with the object in positions so that the first and second planes form an angle of about 90 degrees.

12. The tracking system of claim 1, where the orientation parameter of the object comprises a rotation angle of the object around a predetermined axis;
where the first antenna is located substantially on, a first plane, where the second, antenna is located substantially on a second plane, where the first and second planes are approximately perpendicular to the predetermined axis.

13. The tracking system of claim 1, where the transceiver is located at a fixed location, where the object is moveable relative to the transceiver.

14. The tracking system of claim 1, where the transceiver is included in a head rest of a vehicle seat.

15. The tracking system of claim 1, where the processing unit is configured to generate data based on the orientation parameter of the object for transmission to the object.

16. The tracking system of claim 1, where the signal transmitted from the transceiver comprises an electromagnetic field, where the transceiver is configured to detect the first transceiver by detecting an influence on the electromagnetic field.

17. The tracking system of claim 1, where the signal transmitted from the transceiver comprises an electromagnetic field, where the response from the first transponder comprises an electromagnetic response field, where the transceiver is configured to detect the first transceiver by detecting the electromagnetic response field.

18. The tracking system of claim 1, where the processing unit is configured to set at least one characteristic of the audio data for the headphone unit based on the orientation parameter of the headphone unit.

19. A tracking system, comprising:
an RFID reader configured to transmit a signal and detect a response from a first RFID transponder coupled with an object and a response from a second RFID transponder coupled with the object; and
a processing unit configured to determine an orientation parameter of the object by comparing the response from the first RFID transponder and the response from the second RFID transponder, where the processing unit is configured to generate data based on the orientation parameter of the object for transmission to the object, where the object comprises a headphone unit configured to receive non-binaural audio data and produce a surround sound reproduction of the non-binaural audio data.

20. A tracking system, comprising:
a first transponder having a first antenna with a predetermined directivity, where the first transponder is coupled with a headphone unit configured to receive non-binaural audio data and produce a surround sound reproduction of the audio data; and
a second transponder coupled with the headphone unit and having a second antenna with a predetermined directivity, where an orientation of the second antenna is different from an orientation of the first antenna;
where the first transponder is configured to receive an electromagnetic field and produce a response with a level that varies depending on a relative orientation between the electromagnetic field and the first antenna, where the second transponder is configured to receive the electromagnetic field and produce a response with a level that varies depending on a relative orientation between the electromagnetic field and the second antenna.

21. A tracking system, comprising:
a first transponder having a first antenna with a predetermined directivity, where the first transponder is coupled with a headphone unit configured to receive non-binaural audio data and produce a surround sound reproduction of the audio data;
a second transponder coupled with the headphone unit and having a second antenna with a predetermined directivity, where an orientation of the second antenna is different from an orientation of the first antenna;
a transceiver configured to transmit a signal and detect a response from the first transponder and a response from the second transponder; and
a processing unit configured to determine an orientation parameter of the headphone unit by comparing the response from the first transponder and the response from the second transponder.

22. The tracking system of claim 21, where the processing unit is configured to set at least one characteristic of the audio data for the headphone unit based on the orientation parameter of the headphone unit.

23. The tracking system of claim 21, where the processing unit is configured to detect a change in the orientation parameter of the headphone unit by comparing the response from the first transponder and the response from the second transponder; and
where the surround sound reproduction at the headphone unit includes a virtual sound source, where the processing unit is configured to set the at least one characteristic of the audio data so that the surround sound reproduction at the headphone unit reflects a change to a listener's spatial orientation relative to the virtual sound source that approximately corresponds to the detected change in the orientation parameter of the headphone unit.

24. A method for determining an orientation of an object, comprising:
transmitting a signal;
detecting a response from a first transponder and a response from a second transponder, where the first and second transponders are coupled with the object so that an antenna of the first transponder has a different orientation than an antenna of the second transponder;
comparing the response from the first transponder and the response from the second transponder to determine an orientation parameter of the object; and
generating data based on the orientation parameter of the object for transmission to the object, where the object comprises a headphone unit configured to receive non-binaural audio data and produce a surround sound reproduction of the audio data.

25. The method of claim 24, where the act of detecting comprises detecting a level of the response from the first transponder and a level of the response from the second transponder; and
    where the act of comparing comprises comparing the level of the response from the first transponder with the level of the response from the second transponder to determine the orientation parameter of the object.

26. The method of claim 24, where the first and second transponders comprise RFID transponders, and where the act of emitting comprises emitting the signal from an RFID reader.

27. The method of claim 24, where a first unique transponder identifier is associated with the first transponder, where a second unique transponder identifier is associated with the second transponder; and
    where the act of detecting comprises identifying that the response from the first transponder includes the first unique transponder identifier and that the response from the second transponder includes the second unique transponder identifier.

28. The method of claim 24, where the orientation parameter comprises a first orientation parameter, the method further comprising:
    detecting a response from a third transponder coupled with the object in a position so that an antenna of the third transponder has a different orientation than the antenna of the first transponder; and
    comparing the response from the first transponder and the response from the third transponder to determine a second orientation parameter of the object.

29. The method of claim 24, where the object comprises a first object, the method further comprising:
    detecting a response from a third transponder and a response from a fourth transponder, where the third and fourth transponders are coupled with a second object so that an antenna of the third transponder has a different orientation than an antenna of the fourth transponder; and
    comparing the response from the third transponder and the response from the fourth transponder to determine an orientation parameter of the second object.

30. The method of claim 24, further comprising setting at least one characteristic of the audio data for the headphone unit based on the orientation parameter of the headphone unit.

31. The method of claim 24, further comprising modifying at least one characteristic of the audio data to approximately correspond to a detected change in the orientation parameter of the headphone unit.

32. The method of claim 24, where the surround sound reproduction at the headphone unit includes a virtual sound source, the method further comprising:
    detecting a change in the orientation parameter of the headphone unit by comparing the response from the first transponder and the response from the second transponder; and
    setting the at least one characteristic of the audio data so that the surround sound reproduction at the headphone unit reflects a change to a listener's spatial orientation relative to the virtual sound source that approximately corresponds to the detected change in the orientation parameter of the headphone unit.

* * * * *